(12) United States Patent
Gerzon et al.

(10) Patent No.: US 10,331,564 B2
(45) Date of Patent: Jun. 25, 2019

(54) TECHNOLOGIES FOR SECURE I/O WITH MIPI CAMERA DEVICE

(71) Applicant: Intel Corporation, Santa Clara, CA (US)

(72) Inventors: Gideon Gerzon, Zichron Yaakov (IL); Pradeep Pappachan, Hillsboro, OR (US); Reshma Lal, Hillsboro, OR (US); Siddhartha Chhabra, Portland, OR (US); Bin Xing, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/825,730

(22) Filed: Nov. 29, 2017

(65) Prior Publication Data

US 2019/0042431 A1 Feb. 7, 2019

(51) Int. Cl.
| | |
|---|---|
| G06T 7/00 | (2017.01) |
| H04L 9/32 | (2006.01) |
| G06F 13/28 | (2006.01) |
| H04L 29/06 | (2006.01) |
| G06F 12/0831 | (2016.01) |
| G06F 12/1081 | (2016.01) |

(52) U.S. Cl.
CPC ...... *G06F 12/0835* (2013.01); *G06F 12/1081* (2013.01); *G06F 13/28* (2013.01); *H04L 9/3242* (2013.01); *H04L 63/126* (2013.01); *G06T 7/00* (2013.01)

(58) Field of Classification Search
CPC .. G06F 12/0835; G06F 12/1081; G06F 13/28; H04L 9/3242; H04L 63/126
See application file for complete search history.

(56) References Cited

U.S. PATENT DOCUMENTS

| | | | | |
|---|---|---|---|---|
| 2014/0146195 | A1* | 5/2014 | Ju | H04N 5/23241 348/222.1 |
| 2017/0026181 | A1* | 1/2017 | Chhabra | G06F 9/45558 |
| 2017/0302441 | A1* | 10/2017 | Temple | G06F 21/64 |
| 2017/0364689 | A1* | 12/2017 | Pappachan | G06F 13/20 |

\* cited by examiner

*Primary Examiner* — Glenn A. Auve
(74) *Attorney, Agent, or Firm* — Barnes & Thornburg LLP

(57) ABSTRACT

Technologies for secure I/O with MIPI camera devices include a computing device having a camera controller coupled to a camera and a channel identifier filter. The channel identifier filter detects DMA transactions issued by the camera controller and related to the camera. The channel identifier filter determines whether a DMA transaction includes a secure channel identifier or a non-secure channel identifier. If the DMA transaction includes the non-secure channel identifier, the channel identifier filter allows the DMA transaction. If the DMA transaction includes the secure channel identifier, the channel identifier filter determines whether the DMA transaction is targeted to a memory address in a protected memory range associated with the secure channel identifier. If so, the channel identifier filter allows the DMA transaction. If not, the channel identifier filter blocks the DMA transaction. Other embodiments are described and claimed.

25 Claims, 4 Drawing Sheets

TECHNOLOGIES FOR SECURE I/O WITH MIPI CAMERA DEVICE

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Trusted I/O (TIO) technology enables an application to send and/or receive I/O data securely to/from a device. In addition to the hardware that produces or consumes the I/O data, several software and firmware components in the I/O pipeline might also process the data. HCTIO (Hardware Cryptography-based Trusted I/O) is a technology that provides cryptographic protection of DMA data via an inline Crypto Engine (CE) in the system-on-a-chip (SoC). Channel ID, an identifier, uniquely identifies a DMA channel on the platform, and the CE filters DMA traffic and encrypts select I/O transactions upon a match with the Channel ID programmed in the CE. Certain devices may provide trusted I/O using an inline Channel ID filter in the SoC and a processor-based Crypto Engine (e.g., using microcode or other processor resources).

Many current mobile devices include cameras for capturing video and still images. Many cameras transfer data using a MIPI camera interface developed by the MIPI Alliance. A MIPI camera device may use one or more intermediate buffers in system memory to store image processing pipeline data and otherwise perform image processing tasks.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
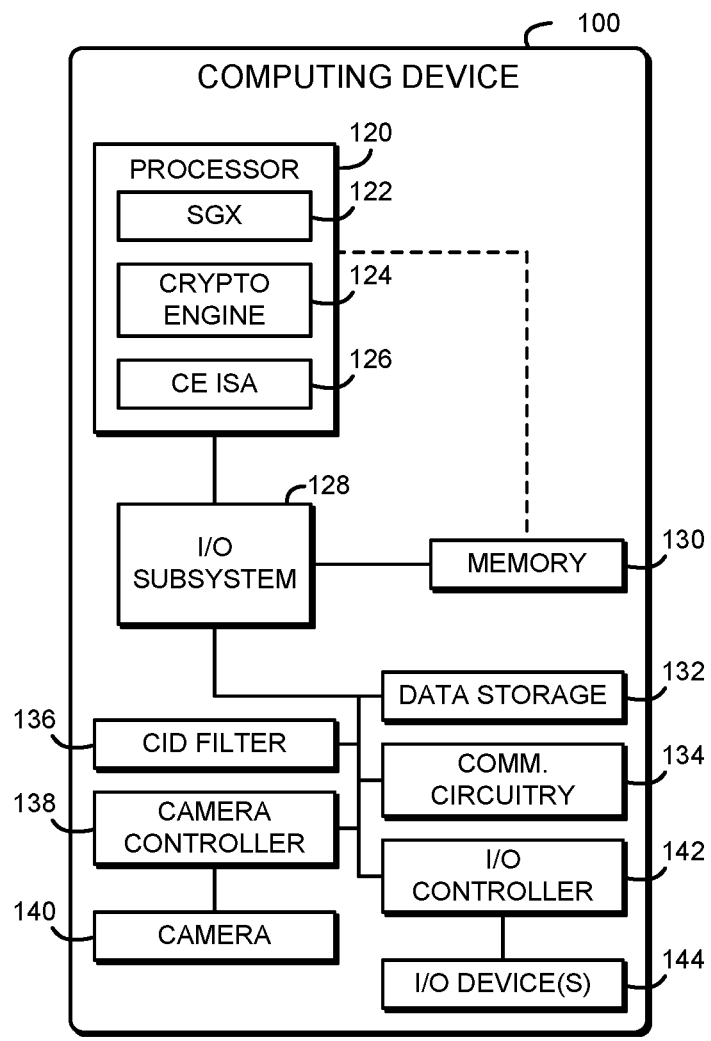
FIG. 1 is a simplified block diagram of at least one embodiment of a computing device for secure I/O with MIPI camera devices.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative computing device 100 for secure I/O with MIPI camera devices is shown. The illustrative computing device 100 includes a channel identifier filter 136, a camera controller 138, and a camera device 140. In use, as described further below, the camera controller 138 generates direct memory access (DMA) transactions for the camera device 140. Each DMA transaction may include one of several channel identifiers (CIDs) assigned to the camera device 140. A non-secure CID may be used for control data or other non-sensitive data, and a secure CID may be used for input image data, intermediate image processing data, output image data, or other sensitive data. The CID filter 136 examines each DMA transaction and ensures that DMA transactions including a secure CID only target a protected memory region that is inaccessible to untrusted software, such as the operating system or operating system drivers. The computing device 100 may not perform encryption or alignment checks for intermediate buffer accesses. The CID filter 136 may allow DMA transactions including a non-secure CID to target ordinary memory accessible to untrusted software. Thus, the computing device 100 may provide secure I/O for camera controllers 138 and camera devices 140 that perform processing in intermediate memory buffers, without incurring excessive encryption or integrity protection overhead. Accordingly, the computing device 100 may provide secure I/O for devices or controllers that read from a buffer in a different order than that used to write to the buffer (e.g., for performance or efficiency reasons) and are thereby incompatible with block encryption. Additionally, by protecting data without alignment checks, the computing device 100 may be compatible with camera controllers 138 that read and write data using different access patterns, such as controllers and/or cameras using a MIPI interface. Accordingly, the computing device 100 may provide secure I/O using existing camera devices and interfaces, which may improve the security of imaging application without increasing cost. Additionally, although illustrated with a camera controller 138 and camera device 140, it should be understood that the computing device 100 may similarly provide secure I/O for any type of device/controller that uses intermediate buffers in memory.

The computing device 100 may be embodied as any type of device capable of performing the functions described herein. For example, the computing device 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device. As shown in FIG. 1, the illustrative computing device 100 includes a processor 120, an I/O subsystem 128, a memory 130, a data storage device 132, and a channel identifier (CID) filter 136. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, a cryptographic engine 124, and a cryptographic engine instruction set architecture (ISA) 126. The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology.

The cryptographic engine 124 may be embodied as one or more hardware functional blocks (IP blocks), microcode, or other resources of the processor 120 that allows the processor 120 to perform trusted I/O (TIO) functions. For example, as described further below, the cryptographic engine 124 may perform TIO functions such as encrypting and/or decrypting DMA I/O data input from and/or output to one or more I/O devices 144. In particular, as described further below, in some embodiments, plaintext I/O data may be stored in a TIO Processor Reserved Memory (TIO PRM) region that is not accessible to software of the computing device 100, and the cryptographic engine 124 may be used to encrypt the plaintext DMA I/O data and copy the encrypted data to an ordinary kernel I/O buffer. The processor 120 may also include one or more range registers or other features to protect the TIO PRM from unauthorized access.

The cryptographic engine ISA 126 may be embodied as one or more processor instructions, model-specific registers, or other processor features that allows software executed by the processor 120 to securely program and otherwise use the cryptographic engine 124 and a corresponding CID filter 136, described further below. For example, the cryptographic engine ISA 126 may include a processor instruction to bind programming instructions or other data to the cryptographic engine 124, the CID filter 136, the camera controller 138, and/or other components of the computing device 100, a processor instruction to unwrap the bound programming instructions and provide them to the target component over a sideband network or other secure fabric of the computing device 100, a processor instruction to securely copy and encrypt data from the TIO PRM region to an unprotected memory buffer, and/or other processor features.

The memory 130 may be embodied as any type of volatile or non-volatile memory or data storage capable of performing the functions described herein. In operation, the memory 130 may store various data and software used during operation of the computing device 100 such as operating systems, applications, programs, libraries, and drivers. As described further below, the memory 130 may also include the TIO PRM region. The memory 130 is communicatively coupled to the processor 120 via the I/O subsystem 128, which may be embodied as circuitry and/or components to facilitate input/output operations with the processor 120, the memory 130, and other components of the computing device 100. For example, the I/O subsystem 128 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. The I/O subsystem 128 may further include a sideband network, secure fabric, or other secure routing support. The secure routing support may include hardware support to ensure I/O data cannot be misrouted in the I/O subsystem 128 under the influence of rogue software. The secure routing support may be used with the CID filter 136 to provide cryptographic protection of I/O data. Additionally, in some embodiments, the I/O subsystem 128 may form a portion of a system-on-a-chip (SoC) and be incorporated, along with the processor 120, the memory 130, and other components of the computing device 100, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 130.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 100 may also include a communications subsystem 134, which may be embodied as any communication circuit, device, or collection thereof, capable of enabling communications between the computing device 100 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The CID filter 136 may be embodied as any hardware component, functional block, logic, or other circuit that performs channel identifier (CID) filtering function(s), including filtering I/O transactions based on CIDs inserted by a corresponding I/O controller (e.g., the camera controller 138). For example, the CID filter 136 may observe DMA transactions inline, perform test(s) based on the CID and memory address included in the transaction, and drop transactions that fail the test(s). In the illustrative embodiment, the CID filter 136 is included in an SoC with the processor 120 and I/O subsystem 128. In other embodiments, the CID filter 136 may be incorporated in one or more components such as the I/O subsystem 128.

The camera controller 138 may be embodied as any image processing unit, image signal processor, embedded controller, microcontroller, microprocessor, functional block, logic, or other circuit or collection of circuits capable of performing the functions described herein. In some embodiments, the camera controller 138 may be embedded in another component of the computing device 100 such as the I/O subsystem 128 and/or the processor 120. The camera controller 138 communicates with one or more cameras 140 over a MIPI interface (e.g., a MIPI physical interface or other communication protocol). The camera 140 may be embodied as a digital camera or other digital imaging device integrated with the computing device 100 or otherwise communicatively coupled thereto. The camera 140 includes an electronic image sensor, such as an active-pixel sensor (APS), e.g., a complementary metal-oxide-semiconductor (CMOS) sensor, or a charge-coupled device (CCD). As described further below, the camera controller 138 may use multiple channel identifiers (CIDs) to identify secure and non-secure I/O transactions associated with a single camera 140. For example, one CID may be used to identify MIPI control and embedded data, a different CID may be used to identify intermediate buffer data, and a further different CID may be used to identify output buffer data. The CIDs used by the camera controller 138 may be included in a platform manifest or otherwise pre-determined, for example by a manufacturer, system integrator, or other entity associated with the computing device 100.

As shown in FIG. 1, the computing device 100 may also include additional I/O controllers 142 coupled to I/O devices 144. Each of the I/O controllers 142 may be embodied as any USB controller, embedded controller, microcontroller, microprocessor, functional block, logic, or other circuit or collection of circuits capable of performing the functions described herein. In some embodiments, one or more of the I/O controllers 142 may be embedded in another component of the computing device 100 such as the I/O subsystem 128 and/or the processor 120. Additionally or alternatively, one or more of the I/O controllers 142 may be connected to the I/O subsystem 128 and/or the processor 120 via an expansion bus such as PCI Express (PCIe) or other I/O connection. Each I/O controller 142 may communicate with one or more I/O devices 144, for example over a peripheral communications bus (e.g., USB, Bluetooth, etc.). The I/O devices 144 may be embodied as any I/O device, such as human interface devices, keyboards, mice, touch screens, microphones, cameras, and other input devices, as well as displays and other output devices. The I/O controllers 142 and associated DMA channels may be uniquely identified using identifiers called channel identifiers (CIDs). Each I/O controller 142 may assert an appropriate CID with every trusted I/O DMA transaction, for example as part of a transaction layer packet (TLP) prefix, to uniquely identify the source of the DMA transaction and provide liveness protections. The CID also enables the isolation of I/O from different devices 144.

Figure 2:
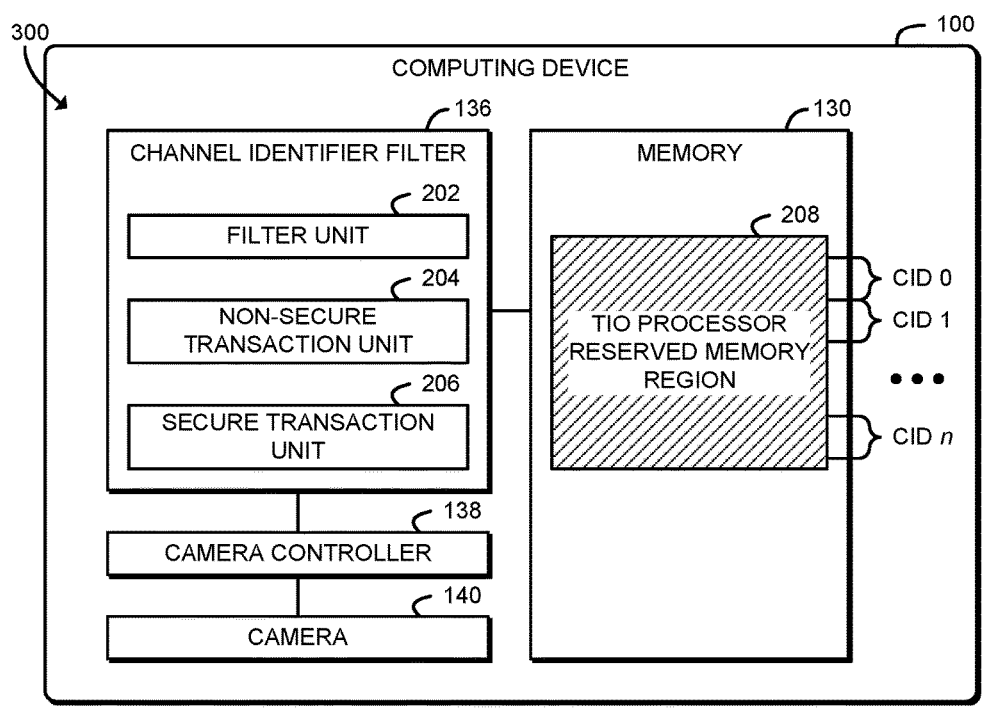
FIG. 2 is a simplified block diagram of at least one embodiment of an environment of the computing device of FIG. 1.

Referring now to FIG. 2, in an illustrative embodiment, the computing device 100 establishes an environment 200 during operation. The illustrative environment 200 includes the CID filter 136, the camera controller 138, the camera 140, and the memory 130. As shown, the channel identifier filter 136 includes a filter unit 202, a non-secure transaction unit 204, and a secure transaction unit 206. The various components of the environment 200 may be embodied as hardware, firmware, software, or a combination thereof. As such, in some embodiments, one or more of the components of the environment 200 may be embodied as circuitry or collection of electrical devices (e.g., filter circuitry 202, non-secure transaction circuitry 204, and/or secure transaction circuitry 206). It should be appreciated that, in such embodiments, one or more of the filter circuitry 202, the non-secure transaction circuitry 204, and/or the secure transaction circuitry 206 may form a portion of the processor 120, the CID filter 136, the camera controller 138, the camera 140, and/or other components of the computing device 100. Additionally, in some embodiments, one or more of the illustrative components may form a portion of another component and/or one or more of the illustrative components may be independent of one another.

The camera controller 138 is configured to generate multiple direct memory access (DMA) transactions for the camera 140. Each DMA transaction includes a channel identifier (CID), which may be embodied as a unique identifier included in a transaction layer packet (TLP) prefix, header, or other metadata included in the DMA transaction. The camera controller 138 may include a non-secure CID in DMA transactions that are not protected by a secure channel. For example, the non-secure CID may be a control CID used to identify control data stored in an unprotected memory buffer in the memory 130. Additionally, the camera controller 138 may include a secure CID in DMA transactions that are protected by a secure channel. DMA transactions with a secure CID may access memory buffers in a protected region of the memory 130, such as a TIO processor reserved memory (PRM) region 208. For example, the secure CID may be an input CID used to identify input data written to an input buffer in the TIO PRM 208, an intermediate CID used to identify accesses to an intermediate buffer in the TIO PRM 208, and/or an output CID used to identify output data written to an output buffer in the TIO PRM 208. The TIO PRM region 208 may be embodied as any segment, range, or other region of the memory 130 that is protected by the processor 120 from access by untrusted software (e.g., protected from the operating system, operating system drivers, virtual machine monitor, or other untrusted software). As described further below, the TIO PRM region 208 may include sub-ranges associated with each CID. The camera controller 138 may be further configured to perform image processing operations on the data stored in an intermediate buffer in the TIO PRM 208. The processor 120 may encrypt data stored in the output buffer in the TIO PRM 208 and copy the encrypted data to an ordinary memory buffer, for example for processing by trusted software.

The filter unit 202 is configured to filter DMA transactions between the I/O controllers of the computing device 100 (e.g., the camera controller 138 and/or other I/O controllers 142) and the memory 130. The filter unit 202 is configured to detect a DMA transaction issued by the camera controller 138 and related to the camera 140. The filter unit 202 may determine whether the DMA transaction includes a CID and, if not, allow the DMA transaction. If the DMA transaction includes a CID, the filter unit 202 is configured to determine whether the DMA transaction includes a non-secure CID (e.g., the control CID) or a secure CID (e.g., the input CID, an intermediate CID, or the output CID).

The non-secure transaction unit 204 is configured to allow the DMA transaction in response to determining that the DMA transaction includes a non-secure CID. Thus, DMA transactions with a non-secure CID may access ordinary memory (e.g., ordinary kernel buffers outside of the TIO PRM 208) that is also accessible by untrusted software.

The secure transaction unit 206 is configured to determine, in response to determining that the DMA transaction includes a secure CID, whether the DMA transaction is targeted to a memory address in a range of the TIO PRM 208 that is associated with secure CID. For example, each CID may be assigned to a CID TIO PRM, which may be embodied as a segment, range, or other sub-region of the TIO PRM 208. The secure transaction unit 206 is configured to allow the DMA transaction if targeted to a memory address in the corresponding CID TIO PRM range of the TIO PRM 208 and to deny the DMA transaction if not targeted to an address in the corresponding CID TIO PRM range (e.g., outside the CID TIO PRM range or outside of the TIO PRM 208 altogether). The secure transaction unit 206 is further configured to determine, in response to determining that the DMA transaction includes the output CID, whether the DMA transaction is targeted to a memory address that is aligned according to a predetermined alignment. The secure transaction unit 206 is further configured to allow the DMA transaction if the memory address is aligned and to block the DMA transaction if the memory address is not aligned.

Figure 3:
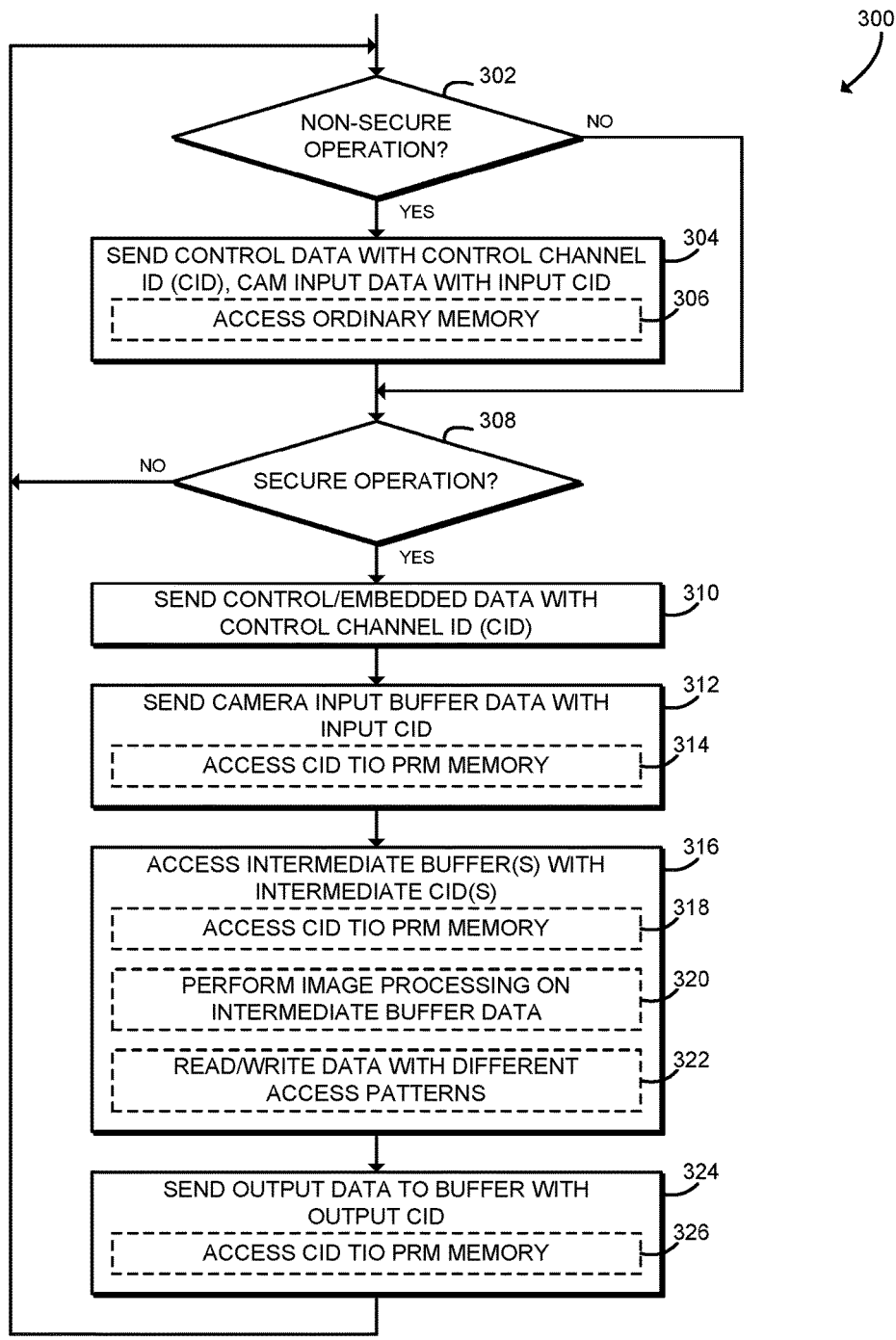
FIG. 3 is a simplified flow diagram of at least one embodiment of a method for secure I/O that may be executed by a camera controller of the computing device of FIGS. 1-2.

Referring now to FIG. 3, in use, the computing device 100 may execute a method 300 for secure I/O. It should be appreciated that, in some embodiments, the operations of the method 300 may be performed by one or more components of the environment 200 of the computing device 100 as shown in FIG. 2, such as the camera controller 138. The method 300 begins in block 302, in which the camera controller 138 determines whether to operate in a non-secure mode. For example, the camera controller 138 may operate in the non-secure mode by default, until programmed into a secure mode by an operating system, driver, or other software executed by the computing device 100. If the camera controller 138 determines not to operate in the non-secure mode (i.e., determines to operate securely), the method 300 branches to block 308, described below. If the camera controller 138 determines to operate non-securely, the method 300 advances to block 304.

In block 304, the camera controller 138 sends control data, such as MIPI control data and/or embedded data with a control channel identifier (CID). The camera controller 138 may also send camera input data with a non-secure input CID. To send the data, the camera controller 138 may generate one or more DMA transactions that include the appropriate CID. The CID may be included in a TLP prefix, header, or other metadata of the DMA transaction. As described below in connection with FIG. 4, the CID filter 136 may allow DMA transactions that include a non-secure CID, such as the control CID or a non-secure input CID, without performing any range checks, alignment checks, or other checks. Therefore, in some embodiments, in block 306 the DMA transactions may access ordinary memory that is accessible by untrusted software. For example, the DMA transactions may access one or more memory buffers outside of the TIO PRM 208, such as kernel memory buffers, user memory buffers, or other non-secure memory buffers.

In block 308, the camera controller 138 determines whether to operate in the secure mode. For example, as described above, the camera controller 138 may operate in the non-secure mode by default, until programmed into the secure mode by an operating system, driver, or other software executed by the computing device 100. If the camera controller 138 determines not to operate in the secure mode (i.e., determines to operate non-securely), the method 300 loops back to block 302. If the camera controller 138 determines to operate securely, the method 300 advances to block 310.

In block 310, the camera controller 138 may send control data, such as MIPI control data and/or embedded data with the control CID. As described above, to send the data, the camera controller 138 may generate one or more DMA transactions that include the control CID. As described below in connection with FIG. 4, the CID filter 136 may allow DMA transactions that include a non-secure CID such as the control CID or a non-secure input CID without performing any range checks, alignment checks, or other checks. Thus, in some embodiments, the DMA transactions may access ordinary memory that is accessible by untrusted software. For example, the DMA transactions may access one or more memory buffers outside of the TIO PRM 208, such as kernel memory buffers, user memory buffers, or other non-secure memory buffers.

In block 312, the camera controller 138 may send camera input buffer data with the input CID. The camera controller 138 may generate one or more DMA transactions that write camera input data to a camera input buffer and that include the input CID. The camera input buffer is located in a protected region of the memory 130 that is not accessible by untrusted software. In some embodiments, in block 314, the DMA transaction may access a CID TIO PRM range, which is a part of the TIO PRM region 208 that is associated with the input CID. As described further below in connection with FIG. 4, the CID filter 136 may check to ensure that the memory address of the DMA transactions is within the CID TIO PRM range associated with the input CID. The processor 120 protects the entire TIO PRM range 208 from access by software. Thus, the input data may be protected from untrusted software without performing potentially expensive integrity protection or encryption operations.

In block 316, the camera controller 138 may access one or more intermediate buffers with a corresponding intermediate CID. The camera controller 138 may generate one or more DMA transactions that read and/or write intermediate data in an intermediate buffer and that include the intermediate CID. Each intermediate buffer is located in a protected region of the memory 130 that is not accessible by untrusted software. In some embodiments, in block 318, the DMA transaction may access a CID TIO PRM range, which is a part of the TIO PRM region 208 that is associated with the intermediate CID. As described further below in connection with FIG. 4, the CID filter 136 may check to ensure that the memory address of the DMA transactions is within the CID TIO PRM range associated with the intermediate CID. As described above, the processor 120 protects the entire TIO PRM range 208 from access by software. Thus, the intermediate data may be protected from untrusted software without performing potentially expensive integrity protection or encryption operations. Additionally or alternatively, in some embodiments, the computing device 100 may further protect the intermediate data from software by disabling the copy and encrypt operations for the CID TIO PRM range associated with the intermediate CID. For example, the EBIND and UNWRAP instructions may be used to program the CID with a new mode that disables the copy and encrypt instruction for the intermediate CID and thus disallows moving data out of the CID TIO PRM range.

In some embodiments, in block 320, the camera controller 138 may perform one or more image processing operations on data included in the intermediate data buffers. Untrusted software, such as an operating system and/or operating system driver, may configure the camera controller 138 to perform one or more image processing operations on input camera data. For example, the camera controller 138 may be configured to set up an image processing pipeline to perform a series of operations on the input data. In that example, the camera controller 138 may store image data and/or intermediate data for each pipeline stage in the memory 130 to reduce on-board memory requirements of the camera controller 138 or to otherwise improve performance for processing large amounts of image data. In some embodiments, in block 322 the camera controller 138 may access the intermediate buffers using different access patterns for reads and writes. For example, data may be written in lines and read in blocks, or vice versa. Because the data is stored in the intermediate buffers without integrity-protection or encryption, the data accessed by the camera controller 138 is valid regardless of the access pattern used by the camera controller 138.

In block 324, the camera controller 138 sends output data to an output buffer with the output CID. The output data may be the final output image data generated by the image processing pipeline of the camera controller 138. The camera controller 138 may generate one or more DMA transactions that write the output data to an output buffer and that include the output CID. The output buffer is located in a protected region of the memory 130 that is not accessible by untrusted software. In some embodiments, in block 326, the DMA transaction may write to a CID TIO PRM range, which is a part of the TIO PRM region 208 that is associated with the output CID. As described further below in connection with FIG. 4, the CID filter 136 may check to ensure that the memory address of the DMA transactions is within the CID TIO PRM range associated with the output CID. The CID filter 136 may also check that DMA transactions including the output CID are aligned in the memory 130. For example, the CID filter 136 may check that the output buffer is aligned according to a minimum block size or other alignment enforced by the CID filter 136. The alignment checks may provide integrity protection, for example by preventing accesses to partial buffers. As described above, the processor 120 protects the entire contents of the TIO PRM range 208, including the output buffer, from access by software. After the output data is written to the output buffer, the cryptographic engine 124 of the processor 120 may encrypt the output data and copy the encrypted data to an ordinary memory buffer accessible by software. The output data may be encrypted with a key controlled by trusted software such as a secure enclave. Thus, the trusted software may securely access the output data with encryption and integrity protection. After writing the output data, the method 300 loops back to block 302.

Figure 4:
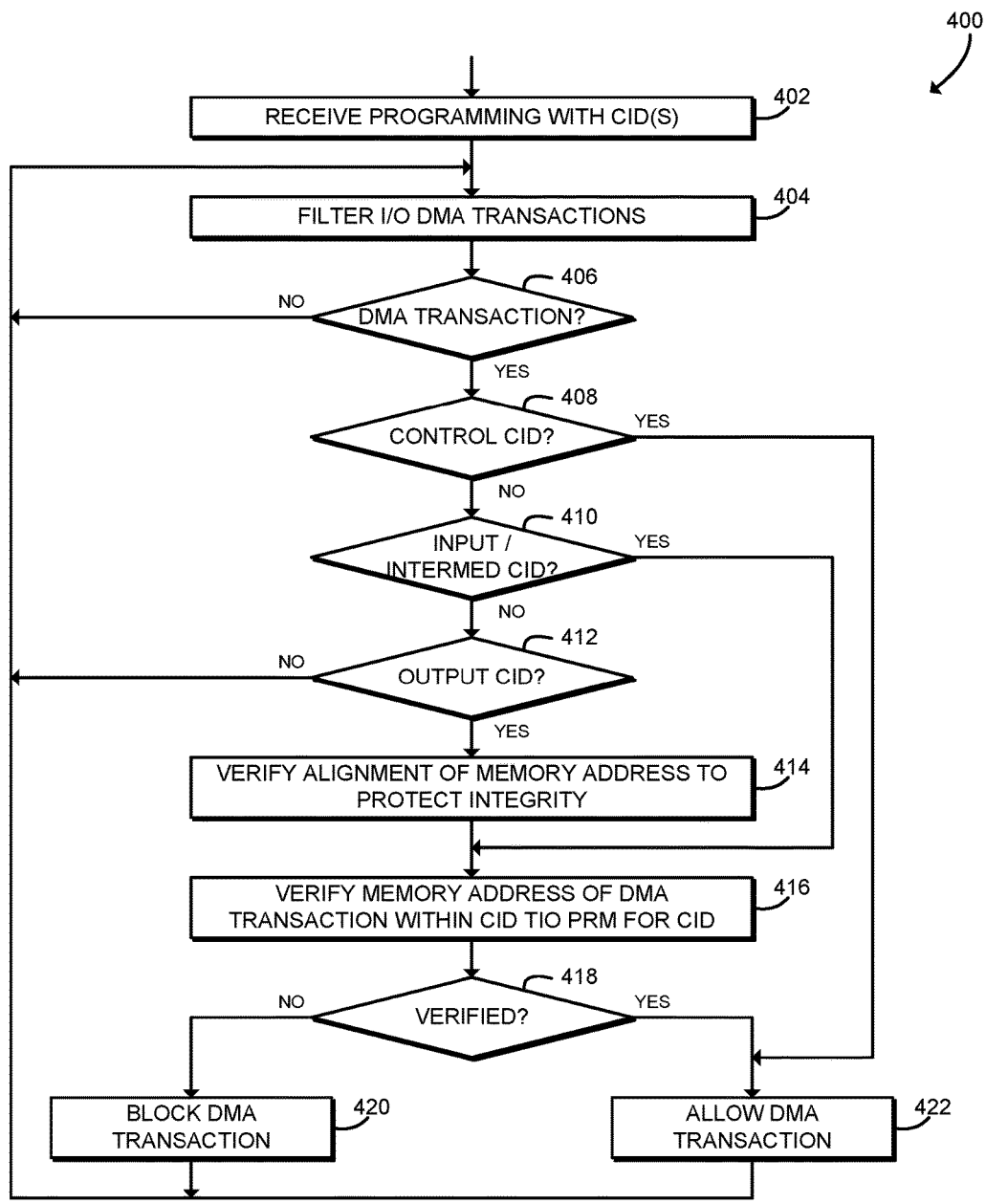
FIG. 4 is a simplified flow diagram of at least one embodiment of a method for secure I/O that may be executed by a channel identifier filter of the computing device of FIGS. 1-2.

Referring now to FIG. 4, in use, the computing device 100 may execute a method 400 for secure I/O. It should be appreciated that, in some embodiments, the operations of the method 400 may be performed by one or more components of the environment 200 of the computing device 100 as shown in FIG. 2, such as the CID filter 136. The method 400 begins in block 402, in which the CID filter 136 receives programming with one or more channel identifiers (CIDs). The programmed CIDs may identify one or more non-secure CIDs (e.g., a control CID) and one or more secure CIDs (e.g., an input OD, an intermediate CID, an output CID, or other secure CID). The CID filter 136 may be programmed using any appropriate technique. For example, trusted software such as an SGX secure enclave may generate wrapped programming information using the EBIND processor instruction. Untrusted software such as an operating system or driver may add the CIDs to unencrypted fields of the wrapped programming information and then execute the UNWRAP instruction to program the CIDs to the CID filter 136. After programming the CID filter 136, the method 400 advances to block 404.

In block 404, the CID filter 136 filters one or more I/O DMA transactions. The CID filter 136 may filter all transactions generated by I/O controllers of the computing device 100, including the camera controller 138 and/or other I/O controllers 142. In block 406, the CID filter 136 determines whether a DMA transaction has been detected. If not, the method 400 loops back to block 404 to continue filtering DMA transactions. If a DMA transaction has been detected, the method 400 advances to block 408.

In block 408, the CID filter 136 determines whether the DMA transaction includes the control CID. As described above, CIDs may be included in the DMA transaction in a TLP prefix, header, or other metadata. If the DMA transaction includes the control CID, the method 400 branches to block 422, in which the CID filter 136 allows the DMA transaction. Thus, DMA transactions with the control CID may access the memory 130 without further checks by the CID filter 136, meaning that DMA transactions with the control CID may access unprotected memory outside of the TIO PRM 208, such as ordinary kernel buffers. After allowing the DMA transaction, the method 400 loops back to block 404 to continue filtering DMA transactions.

Referring back to block 408, if the DMA transaction does not include the control CID, the method 400 advances to block 410, in which the CID filter 136 determines whether the DMA transaction includes the input CID or an intermediate CID. If so, the method 400 branches ahead to block 416, described below. If the DMA transaction does not include the input CID or an intermediate CID, the method 400 advances to block 412.

In block 412, the CID filter 136 determines whether the DMA transaction includes the output CID. If so, the method 400 advances to block 414, described below. If the DMA transaction does not include the output CID, such as when the CID filter 136 intercepts a DMA transaction from an I/O controller 142 other than the camera controller 138, the CID filter 136 may perform one or more default filter operations or other processing operations. For example, the CID filter 136 may verify the alignment of the DMA transaction and verify that the DMA transaction is targeted within the appropriate CID TIO PRM range. As another example, if the CID of the DMA transaction has not been previously programmed to the CID filter 136, the CID filter 136 may allow the DMA transaction without performing any checks or other processing operations. After performing the default operation, the method 400 loops back to block 404 to continue filtering DMA transactions.

Referring back to block 412, if the DMA transaction includes the output CID, the method 400 advances to block 414, in which the CID filter 136 verifies the alignment of the memory address of the DMA transaction. The CID filter 136 may verify that the memory address of the DMA transaction is aligned according to any pre-determined memory alignment. For example, the CID filter 136 may verify that the DMA transaction starts at a predetermined minimum block size boundary. Enforcing alignment may provide integrity protection, for example by preventing accesses to partial output buffers.

In block 416, the CID filter 136 verifies that the memory address of the DMA transaction is included within the CID TIO PRM range that corresponds to the CID of the DMA transaction. For example, based on the CID included in the DMA transaction, the CID filter 136 may verify that the memory address is included within the CID TIO PRM range associated with the input CID, the intermediate CID, or the output CID, respectively.

In block 418, the CID filter 136 determines whether the DMA transaction was successfully verified. In particular, the CID filter 136 may determine whether the memory address is included in the appropriate CID TIO PRM range. Additionally, if the DMA transaction includes the output CID, the CID filter 136 may verify that the memory address is aligned. If the DMA transaction is successfully verified, the method 400 branches to block 422, in which the CID filter 136 allows the DMA transaction. Thus, the camera controller 138 may read, write, or otherwise access data stored in the TIO PRM range 208, which is not accessible by software executed by the computing device 100, including the operating system, operating system drivers, or other untrusted software. After allowing the DMA transaction, the method 400 loops back to block 404 to continue filtering DMA transactions Referring back to block 418, if the DMA transaction was not successfully verified, the method 400 branches to block 420. In block 420, the CID filter 136 blocks the DMA transaction. The CID filter 136 may use any technique to block the DMA transaction, such as dropping the DMA transaction data, raising an exception, or otherwise preventing the DMA transaction from successfully completing. The CID filter 136 may also indicate an error to trusted or untrusted software executed by the computing device 100. Thus, by blocking the DMA transaction, the CID filter 136 may prevent secure data from being stored in a memory range that is accessible to untrusted software. After blocking the DMA transaction, the method 400 may loop back to block 404 to continue filtering DMA transactions.

It should be appreciated that, in some embodiments, the methods 300 and/or 400 may be embodied as various instructions stored on a computer-readable media, which may be executed by the processor 120, the I/O subsystem 128, the CID filter 136, the camera controller 138, and/or other components of the computing device 100 to cause the computing device 100 to perform the respective method 300 and/or 400. The computer-readable media may be embodied as any type of media capable of being read by the computing device 100 including, but not limited to, the memory 130, the data storage device 132, firmware devices, other memory or data storage devices of the computing device 100, portable media readable by a peripheral device 144 of the computing device 100, and/or other media.

EXAMPLES

Illustrative examples of the technologies disclosed herein are provided below. An embodiment of the technologies may include any one or more, and any combination of, the examples described below.

Example 1 includes a computing device for secure camera usage, the computing device comprising: a camera controller coupled to a camera device; and a channel identifier filter, wherein the channel identifier filter comprises: a filter unit to (i) detect a first DMA transaction issued by the camera controller of and related to the camera device and (ii) determine whether the first DMA transaction includes a first channel identifier indicative of non-secure transfer or a second channel identifier indicative of secure transfer in response to detection of the first DMA transaction; a non-secure transaction unit to allow the first DMA transaction in response to a determination that the first DMA transaction includes the first channel identifier; and a secure transaction unit to (i) determine whether the first DMA transaction is targeted to a memory address in a protected memory range associated with the second channel identifier in response to a determination that the first DMA transaction includes the second channel identifier, and (ii) allow the first DMA transaction in response to a determination that the first DMA transaction is targeted to the memory address in the protected memory range.

Example 2 includes the subject matter of Example 1, and wherein the secure transaction unit is further to block the first DMA transaction in response to a determination that the first DMA transaction is not targeted to the memory address in the protected memory range.

Example 3 includes the subject matter of any of Examples 1 and 2, and wherein the first channel identifier is indicative of control data.

Example 4 includes the subject matter of any of Examples 1-3, and wherein the camera controller is to generate the first DMA transaction, wherein the first DMA transaction includes the first channel identifier, and wherein the first DMA transaction accesses a control buffer outside of the protected memory range.

Example 5 includes the subject matter of any of Examples 1-4, and wherein the second channel identifier is indicative of camera input data.

Example 6 includes the subject matter of any of Examples 1-5, and wherein the camera controller is to generate the first DMA transaction, wherein the first DMA transaction includes the second channel identifier, and wherein the first DMA transaction writes camera input data to an input buffer in the protected memory range associated with the second channel identifier.

Example 7 includes the subject matter of any of Examples 1-6, and wherein the second channel identifier is indicative of intermediate buffer processing.

Example 8 includes the subject matter of any of Examples 1-7, and wherein the camera controller is to generate the first DMA transaction, wherein the first DMA transaction includes the second channel identifier, and wherein the first DMA transaction accesses an intermediate buffer in the protected memory range associated with the second channel identifier.

Example 9 includes the subject matter of any of Examples 1-8, and wherein the camera controller is further to perform image processing on the intermediate buffer in response to allowance of the first DMA transaction.

Example 10 includes the subject matter of any of Examples 1-9, and wherein the second channel identifier is indicative of final output.

Example 11 includes the subject matter of any of Examples 1-10, and wherein: the secure transaction unit is further to determine whether the first DMA transaction is targeted to a memory address that is aligned according to a predetermined alignment in response to the determination that the first DMA transaction includes the second channel identifier; and to allow the first DMA transaction in response to the determination that the first DMA transaction is targeted to the memory address in the protected memory range further comprises to allow the first DMA transaction in response to a determination that the first DMA transaction is targeted to a memory address that is aligned.

Example 12 includes the subject matter of any of Examples 1-11, and wherein the secure transaction unit is further block the first DMA transaction in response to a determination that the first DMA transaction is not targeted to the memory address that is aligned.

Example 13 includes the subject matter of any of Examples 1-12, and wherein the camera controller is to generate the first DMA transaction, wherein the first DMA transaction includes the second channel identifier, and wherein the first DMA transaction accesses an output buffer in the protected memory range associated with the second channel identifier.

Example 14 includes the subject matter of any of Examples 1-13, and wherein the camera controller comprises a MIPI camera protocol controller.

Example 15 includes the subject matter of any of Examples 1-14, and wherein the protected memory range comprises a processor reserved memory range.

Example 16 includes the subject matter of any of Examples 1-15, and wherein to determine whether the first DMA transaction includes the first channel identifier or the second channel identifier comprises to determine whether the first DMA transaction includes a transaction layer packet prefix equal to the first channel identifier or the second channel identifier.

Example 17 includes the subject matter of any of Examples 1-16, and wherein: the filter unit is further to filter DMA transactions between I/O controllers of the computing device and a memory of the computing device; and to detect the first DMA transaction comprises to detect the first DMA transaction in response to filtering of the DMA transactions.

Example 18 includes a method for secure camera usage, the method comprising: detecting, by a channel identifier filter of a computing device, a first DMA transaction issued by a camera controller of the computing device and relating to a camera device of the computing device; determining, by the channel identifier filter, whether the first DMA transaction includes a first channel identifier indicative of non-secure transfer or a second channel identifier indicative of secure transfer in response to detecting the first DMA transaction; allowing, by the channel identifier filter, the first DMA transaction in response to determining that the first DMA transaction includes the first channel identifier; determining, by the channel identifier filter, whether the first DMA transaction is targeted to a memory address in a protected memory range associated with the second channel identifier in response to determining that the first DMA transaction includes the second channel identifier; and allowing, by the channel identifier filter, the first DMA transaction in response to determining that the first DMA transaction is targeted to the memory address in the protected memory range.

Example 19 includes the subject matter of Example 18, and further comprising blocking, by the channel identifier filter, the first DMA transaction in response to determining that the first DMA transaction is not targeted to the memory address in the protected memory range.

Example 20 includes the subject matter of any of Examples 18 and 19, and wherein the first channel identifier is indicative of control data.

Example 21 includes the subject matter of any of Examples 18-20, and further comprising generating, by the camera controller, the first DMA transaction, wherein the first DMA transaction includes the first channel identifier, and wherein the first DMA transaction accesses a control buffer outside of the protected memory range.

Example 22 includes the subject matter of any of Examples 18-21, and wherein the second channel identifier is indicative of camera input data.

Example 23 includes the subject matter of any of Examples 18-22, and further comprising generating, by the camera controller, the first DMA transaction, wherein the first DMA transaction includes the second channel identifier, and wherein the first DMA transaction writes camera input data to an input buffer in the protected memory range associated with the second channel identifier.

Example 24 includes the subject matter of any of Examples 18-23, and wherein the second channel identifier is indicative of intermediate buffer processing.

Example 25 includes the subject matter of any of Examples 18 24, and further comprising generating, by the camera controller, the first DMA transaction, wherein the first DMA transaction includes the second channel identifier, and wherein the first DMA transaction accesses an intermediate buffer in the protected memory range associated with the second channel identifier.

Example 26 includes the subject matter of any of Examples 18-25, and further comprising performing, by the camera controller, image processing on the intermediate buffer in response to allowing the first DMA transaction.

Example 27 includes the subject matter of any of Examples 18-26, and wherein the second channel identifier is indicative of final output.

Example 28 includes the subject matter of any of Examples 18-27, and further comprising: determining, by the channel identifier filter, whether the first DMA transaction is targeted to a memory address that is aligned according to a predetermined alignment in response to determining that the first DMA transaction includes the second channel identifier; wherein allowing the first DMA transaction in response to determining that the first DMA transaction is targeted to the memory address in the protected memory range further comprises allowing the first DMA transaction in response to determining that the first DMA transaction is targeted to a memory address that is aligned.

Example 29 includes the subject matter of any of Examples 18-28, and further comprising blocking, by the channel identifier filter, the first DMA transaction in response to determining that the first DMA transaction is not targeted to the memory address that is aligned.

Example 30 includes the subject matter of any of Examples 18-29, and further comprising generating, by the camera controller, the first DMA transaction, wherein the first DMA transaction includes the second channel identifier, and wherein the first DMA transaction accesses an output buffer in the protected memory range associated with the second channel identifier.

Example 31 includes the subject matter of any of Examples 18-30, and wherein the camera controller comprises a MIPI camera protocol controller.

Example 32 includes the subject matter of any of Examples 18-31, and wherein the protected memory range comprises a processor reserved memory range.

Example 33 includes the subject matter of any of Examples 18-32, and wherein determining whether the first DMA transaction includes the first channel identifier or the second channel identifier comprises determining whether the first DMA transaction includes a transaction layer packet prefix equal to the first channel identifier or the second channel identifier.

Example 34 includes the subject matter of any of Examples 18-33, and further comprising: filtering, by the channel identifier filter, DMA transactions between I/O controllers of the computing device and a memory of the computing device; wherein detecting the first DMA transaction comprises detecting the first DMA transaction in response to filtering the DMA transactions.

Example 35 includes a computing device comprising: a processor; and a memory having stored therein a plurality of instructions that when executed by the processor cause the computing device to perform the method of any of Examples 18-34.

Example 36 includes one or more non-transitory, computer readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a computing device for secure camera usage, the computing device comprising: means for detecting, by a channel identifier filter of the computing device, a first DMA transaction issued by a camera controller of the computing device and relating to a camera device of the computing device; means for determining, by the channel identifier filter, whether the first DMA transaction includes a first channel identifier indicative of non-secure transfer or a second channel identifier indicative of secure transfer in response to detecting the first DMA transaction; means for allowing, by the channel identifier filter, the first DMA transaction in response to determining that the first DMA transaction includes the first channel identifier; means for determining, by the channel identifier filter, whether the first DMA transaction is targeted to a memory address in a protected memory range associated with the second channel identifier in response to determining that the first DMA transaction includes the second channel identifier; and means for allowing, by the channel identifier filter, the first DMA transaction in response to determining that the first DMA transaction is targeted to the memory address in the protected memory range.

Example 39 includes the subject matter of Example 38, and further comprising means for blocking, by the channel identifier filter, the first DMA transaction in response to determining that the first DMA transaction is not targeted to the memory address in the protected memory range.

Example 40 includes the subject matter of any of Examples 38 and 39, and wherein the first channel identifier is indicative of control data.

Example 41 includes the subject matter of any of Examples 38-40, and further comprising means for generating, by the camera controller, the first DMA transaction, wherein the first DMA transaction includes the first channel identifier, and wherein the first DMA transaction accesses a control buffer outside of the protected memory range.

Example 42 includes the subject matter of any of Examples 38-41, and wherein the second channel identifier is indicative of camera input data.

Example 43 includes the subject matter of any of Examples 38-42, and further comprising means for generating, by the camera controller, the first DMA transaction, wherein the first DMA transaction includes the second channel identifier, and wherein the first DMA transaction writes camera input data to an input buffer in the protected memory range associated with the second channel identifier.

Example 44 includes the subject matter of any of Examples 38-43, and wherein the second channel identifier is indicative of intermediate buffer processing.

Example 45 includes the subject matter of any of Examples 38-44, and further comprising means for generating, by the camera controller, the first DMA transaction, wherein the first DMA transaction includes the second channel identifier, and wherein the first DMA transaction accesses an intermediate buffer in the protected memory range associated with the second channel identifier.

Example 46 includes the subject matter of any of Examples 38-45, and further comprising means for performing, by the camera controller, image processing on the intermediate buffer in response to allowing the first DMA transaction.

Example 47 includes the subject matter of any of Examples 38-46, and wherein the second channel identifier is indicative of final output.

Example 48 includes the subject matter of any of Examples 38-47, and further comprising: means for determining, by the channel identifier filter, whether the first DMA transaction is targeted to a memory address that is aligned according to a predetermined alignment in response to determining that the first DMA transaction includes the second channel identifier; wherein the means for allowing the first DMA transaction in response to determining that the first DMA transaction is targeted to the memory address in the protected memory range further comprises means for allowing the first DMA transaction in response to determining that the first DMA transaction is targeted to a memory address that is aligned.

Example 49 includes the subject matter of any of Examples 38-48, and further comprising means for blocking, by the channel identifier filter, the first DMA transaction in response to determining that the first DMA transaction is not targeted to the memory address that is aligned.

Example 50 includes the subject matter of any of Examples 38-49, and further comprising means for generating, by the camera controller, the first DMA transaction, wherein the first DMA transaction includes the second channel identifier, and wherein the first DMA transaction accesses an output buffer in the protected memory range associated with the second channel identifier.

Example 51 includes the subject matter of any of Examples 38-50, and wherein the camera controller comprises a MIPI camera protocol controller.

Example 52 includes the subject matter of any of Examples 38-51, and wherein the protected memory range comprises a processor reserved memory range.

Example 53 includes the subject matter of any of Examples 38-52, and wherein the means for determining whether the first DMA transaction includes the first channel identifier or the second channel identifier comprises means for determining whether the first DMA transaction includes a transaction layer packet prefix equal to the first channel identifier or the second channel identifier.

Example 54 includes the subject matter of any of Examples 38-53, and further comprising: means for filtering, by the channel identifier filter, DMA transactions between I/O controllers of the computing device and a memory of the computing device; wherein the means for detecting the first DMA transaction comprises means for detecting the first DMA transaction in response to filtering the DMA transactions.

The invention claimed is:

1. A computing device for secure camera usage, the computing device comprising:
   a camera controller coupled to a camera device; and
   a channel identifier filter, wherein the channel identifier filter comprises:
      a filter unit to (i) detect a first DMA transaction issued by the camera controller of and related to the camera device and (ii) determine whether the first DMA transaction includes a first channel identifier indicative of non-secure transfer or a second channel identifier indicative of secure transfer in response to detection of the first DMA transaction;
      a non-secure transaction unit to allow the first DMA transaction in response to a determination that the first DMA transaction includes the first channel identifier; and
      a secure transaction unit to (i) determine whether the first DMA transaction is targeted to a memory address in a protected memory range associated with the second channel identifier in response to a determination that the first DMA transaction includes the second channel identifier, and (ii) allow the first DMA transaction in response to a determination that the first DMA transaction is targeted to the memory address in the protected memory range.

2. The computing device of claim 1, wherein the secure transaction unit is further to block the first DMA transaction in response to a determination that the first DMA transaction is not targeted to the memory address in the protected memory range.

3. The computing device of claim 1, wherein the first channel identifier is indicative of control data.

4. The computing device of claim 3, wherein the camera controller is to generate the first DMA transaction, wherein the first DMA transaction includes the first channel identifier, and wherein the first DMA transaction accesses a control buffer outside of the protected memory range.

5. The computing device of claim 1, wherein the second channel identifier is indicative of camera input data.

6. The computing device of claim 1, wherein the second channel identifier is indicative of intermediate buffer processing.

7. The computing device of claim 6, wherein the camera controller is to generate the first DMA transaction, wherein the first DMA transaction includes the second channel identifier, and wherein the first DMA transaction accesses an intermediate buffer in the protected memory range associated with the second channel identifier.

8. The computing device of claim 7, wherein the camera controller is further to perform image processing on the intermediate buffer in response to allowance of the first DMA transaction.

9. The computing device of claim 1, wherein the second channel identifier is indicative of final output.

10. The computing device of claim 9, wherein:
    the secure transaction unit is further to determine whether the first DMA transaction is targeted to a memory address that is aligned according to a predetermined alignment in response to the determination that the first DMA transaction includes the second channel identifier; and
    to allow the first DMA transaction in response to the determination that the first DMA transaction is targeted to the memory address in the protected memory range further comprises to allow the first DMA transaction in response to a determination that the first DMA transaction is targeted to a memory address that is aligned.

11. The computing device of claim 10, wherein the secure transaction unit is further to block the first DMA transaction in response to a determination that the first DMA transaction is not targeted to the memory address that is aligned.

12. The computing device of claim 9, wherein the camera controller is to generate the first DMA transaction, wherein the first DMA transaction includes the second channel identifier, and wherein the first DMA transaction accesses an output buffer in the protected memory range associated with the second channel identifier.

13. The computing device of claim 1, wherein the camera controller comprises a MIPI camera protocol controller.

14. A method for secure camera usage, the method comprising:
    detecting, by a channel identifier filter of a computing device, a first DMA transaction issued by a camera controller of the computing device and relating to a camera device of the computing device;
    determining, by the channel identifier filter, whether the first DMA transaction includes a first channel identifier indicative of non-secure transfer or a second channel identifier indicative of secure transfer in response to detecting the first DMA transaction;
    allowing, by the channel identifier filter, the first DMA transaction in response to determining that the first DMA transaction includes the first channel identifier;
    determining, by the channel identifier filter, whether the first DMA transaction is targeted to a memory address in a protected memory range associated with the second channel identifier in response to determining that the first DMA transaction includes the second channel identifier; and
    allowing, by the channel identifier filter, the first DMA transaction in response to determining that the first DMA transaction is targeted to the memory address in the protected memory range.

15. The method of claim 14, wherein the first channel identifier is indicative of control data.

16. The method of claim 14, wherein the second channel identifier is indicative of intermediate buffer processing.

17. The method of claim 16, further comprising:
    generating, by the camera controller, the first DMA transaction, wherein the first DMA transaction includes the second channel identifier, and wherein the first DMA transaction accesses an intermediate buffer in the protected memory range associated with the second channel identifier; and
    performing, by the camera controller, image processing on the intermediate buffer in response to allowing the first DMA transaction.

18. The method of claim 14, wherein the second channel identifier is indicative of final output.

19. The method of claim 18, further comprising:
determining, by the channel identifier filter, whether the first DMA transaction is targeted to a memory address that is aligned according to a predetermined alignment in response to determining that the first DMA transaction includes the second channel identifier;
wherein allowing the first DMA transaction in response to determining that the first DMA transaction is targeted to the memory address in the protected memory range further comprises allowing the first DMA transaction in response to determining that the first DMA transaction is targeted to a memory address that is aligned.

20. One or more non-transitory, computer-readable storage media comprising a plurality of instructions stored thereon that, in response to being executed, cause a computing device to:
detect, by a channel identifier filter of the computing device, a first DMA transaction issued by a camera controller of the computing device and relating to a camera device of the computing device;
determine, by the channel identifier filter, whether the first DMA transaction includes a first channel identifier indicative of non-secure transfer or a second channel identifier indicative of secure transfer in response to detecting the first DMA transaction;
allow, by the channel identifier filter, the first DMA transaction in response to determining that the first DMA transaction includes the first channel identifier;
determine, by the channel identifier filter, whether the first DMA transaction is targeted to a memory address in a protected memory range associated with the second channel identifier in response to determining that the first DMA transaction includes the second channel identifier; and
allow, by the channel identifier filter, the first DMA transaction in response to determining that the first DMA transaction is targeted to the memory address in the protected memory range.

21. The one or more non-transitory, computer-readable storage media of claim 20, wherein the first channel identifier is indicative of control data.

22. The one or more non-transitory, computer-readable storage media of claim 20, wherein the second channel identifier is indicative of intermediate buffer processing.

23. The one or more non-transitory, computer-readable storage media of claim 22, further comprising a plurality of instructions stored thereon that, in response to being executed, cause the computing device to:
generate, by the camera controller, the first DMA transaction, wherein the first DMA transaction includes the second channel identifier, and wherein the first DMA transaction accesses an intermediate buffer in the protected memory range associated with the second channel identifier; and
perform, by the camera controller, image processing on the intermediate buffer in response to allowing the first DMA transaction.

24. The one or more non-transitory, computer-readable storage media of claim 20, wherein the second channel identifier is indicative of final output.

25. The one or more non-transitory, computer-readable storage media of claim 24, further comprising a plurality of instructions stored thereon that, in response to being executed, cause the computing device to:
determine, by the channel identifier filter, whether the first DMA transaction is targeted to a memory address that is aligned according to a predetermined alignment in response to determining that the first DMA transaction includes the second channel identifier;
wherein to allow the first DMA transaction in response to determining that the first DMA transaction is targeted to the memory address in the protected memory range further comprises to allow the first DMA transaction in response to determining that the first DMA transaction is targeted to a memory address that is aligned.

* * * * *